March 4, 1952 R. C. EATON 2,588,094
CONTINUOUS WAVE DETECTION SYSTEM
Filed Sept. 8, 1949
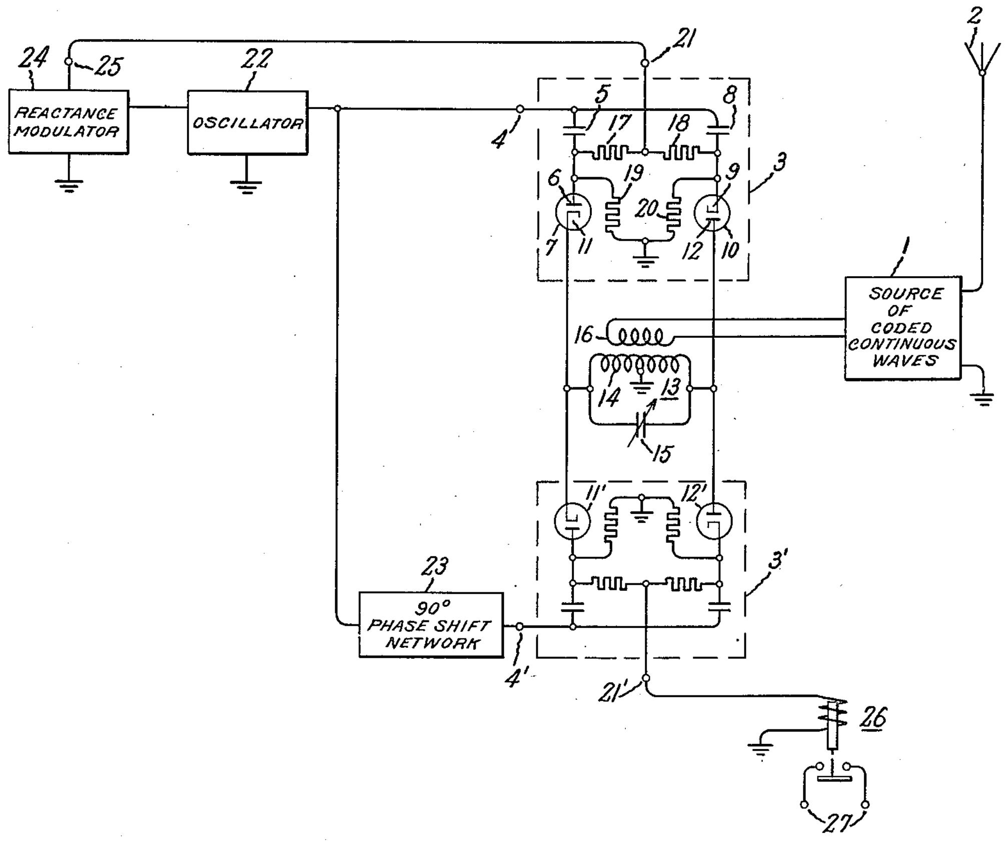
Inventor:
Richard C. Eaton,
by Morton D. Morse
His Attorney.

Patented Mar. 4, 1952 2,588,094

UNITED STATES PATENT OFFICE 2,588,094

CONTINUOUS WAVE DETECTION SYSTEM

Richard C. Eaton, North Syracuse, N. Y., assignor to General Electric Company, a corporation of New York Application September 8, 1949, Serial No. 114,663

7 Claims. (Cl. 250—36)

This invention relates generally to communication systems, and more particularly to a system for receiving keyed or coded continuous wave signals.

Radio receivers presently in use generally contain amplifying stages for increasing the amplitude of signals picked up by an antenna, and an amplitude detector for providing a rectified or demodulated output signal which corresponds to the envelope of a carrier wave. Such a radio receiver depends for its selectivity and for its discrimination against extraneous noise upon its sharpness of tuning. However, any modulated signal contains side frequencies and, accordingly, the amplifying stages in a receiver must be provided with sufficient bandwidth to accept these.

In the case of coded continuous wave signals, the width of the band occupied by the side frequencies is proportional to the keying speed. The receiver must be provided with sufficient bandwidth to respond to these side frequencies. However, the amount of extraneous noise picked up by the receiver varies as the square root of the bandwidth. Accordingly, there is a certain limiting signal-to-noise ratio imposed upon the operation of such a receiver, with the result that a signal will not be distinguished from noise unless it has a required minimum amplitude.

The above described characteristics appear to be inherent limitations of receiving systems utilizing amplitude detectors. My invention utilizes a pair of phase detectors in conjunction with a continuous wave receiver. This permits a much greater discrimination against noise than is possible with amplitude detectors and allows the reception of much weaker signals.

Accordingly, it is an object of my invention to provide a new and improved receiving system for detecting coded continuous wave signals.

A further object of my invention is to provide a detection system, for coded continuous wave signals, which utilizes phase detectors to provide greater discrimination against undesired extraneous noise than the amplitude detectors utilized heretofore.

For further objects and advantages and for a better understanding of the invention, attention is now directed to the following description and accompanying drawing. The features of my invention believed to be novel will be more particularly pointed out in the appended claims.

The single figure of the drawing is a schematic diagram of a coded continuous wave detection system embodying my invention.

Referring to the drawing, there is shown a source 1 of coded continuous waves, which may, for instance, consist of the usual radio frequency and intermediate frequency amplifying stages of a superheterodyne radio receiver connected to an antenna 2. Source 1 may also be simply an amplifier receiving a coded continuous wave input signal from a suitable transmission line. The actual source of the signal is immaterial and my detection system is adaptable to operate in conjunction with any communication system wherein intelligence is conveyed by interrupting a source of continuous waves to produce thereby characters whose length, time duration and sequence are representative of some intelligence.

The signal from source 1 is supplied to a pair of phase detectors 3 and 3′ constituted by the circuits shown enclosed within the dashed rectangles. These phase detectors are in every respect similar to the phase detector which I have described in my copending application Serial No. 105,946, entitled Balanced Phase Detector, filed July 21, 1949, and assigned to the same assignee as the present invention. On August 14, 1951, that application issued as Patent 2,564,471. Phase detector 3 has an input terminal 4 connected through a capacitor 5 to the anode 6 of a diode rectifier 7, and through a capacitor 8 to the cathode 9 of a diode rectifier 10. Cathode 11 and anode 12 of diodes 7 and 10 provide input terminals which are connected to opposite sides of a tuned circuit 13 comprising an inductance 14 and a variable capacitor 15. The center point of inductance 14 is connected to a common ground point. Source 1 is inductively coupled to tuned circuit 13 by means of a winding 16. Anode 6 and cathode 9 are connected together by a pair of equal resistors 17 and 18 and are also connected to ground through equal resistors 19 and 20. The junction of resistors 17 and 18 serves as an output terminal 21.

Phase detector 3′ consists of a circuit identical to that of phase detector 3. The component parts thereof will be referred to, accordingly, by the same numerals characterized by a prime mark. Cathode 11′ and anode 12′ are likewise connected to opposite sides of tuned circuit 13.

An oscillator 22 is connected to input terminal 4 of phase detector 3 and is also connected through a 90° phase shift network 23 to input terminal 4′ of phase detector 3′. Oscillator 22 may consist of any one of the commonly utilized types of electronic oscillators, such as, for example, a Colpitts oscillator, and is normally adjusted to provide a signal of the same frequency as that received from source 1.

A reactance modulator 24 is connected to oscillator 22 and has a control terminal 25 connected to output terminal 21 of phase detector 3. Reactance modulator 24 may consist of any one of the well-known types of electronic tube circuits employed for controlling the operating frequency of electronic oscillators. One such circuit, known as a reactance tube, consists of an electron discharge device having its anode-to-cathode circuit connected in parallel with that of an electronic oscillator and having its control electrode connected to its anode through a 90° phase shifting network. The magnitude of the equivalent reactance offered by the reactance tube can then be varied by changing the magnitude of a unidirectional control voltage supplied to the control electrode. For further information on such reactance modulators, reference is made to the textbook "Radio Engineering" by F. E. Terman (McGraw-Hill, 3rd edition, 1947, page 493). Phase shift network 23 may likewise be any one of the well-known circuits utilized for shifting the phase of a signal by 90°; for instance, a pair of loosely coupled resonant circuits may be utilized for the purpose.

In operation, oscillator 22 provides at the anode 6 and cathode 9 of diode rectifiers 7 and 10 an alternating voltage normally of the same frequency as the signals intended to be received from source 1. In the absence of any signal from source 1, each diode conducts to the same extent and develops across its associated capacitor, 5 and 8 respectively, unidirectional voltages which are equal in magnitude but opposite in polarity. Accordingly, equal voltage drops of opposite polarities occur across resistors 19 and 20. Since both diodes conduct equally and symmetry has been maintained in the circuit, the mean voltage at terminal 21 is zero. Similarly, the voltage at terminal 21′ of phase detector 3′ is zero. For a more elaborate explanation of the phase detector circuits, reference is made to my aforementioned copending application, Serial No. 105,946.

When source 1 provides a signal to tuned circuit 13, voltages of opposite phase are produced at cathode 11 and anode 12. If these voltages are in quadrature phase relationship with the voltage applied to anode 6 and cathode 9 from oscillator 22, then the instantaneous value of the voltage applied from source 1 passes through zero during the occurrence of current pulses through the diodes. Accordingly, each diode still conducts to exactly the same extent as in the absence of a signal from source 1, and the value of unidirectional voltage at terminal 21 remains zero. If the phase relationship between the oscillations from source 1 and those from oscillator 22 departs from quadrature, the unidirectional potentials at anode 6 and cathode 9 will be altered in one direction, either positive or negative, the polarity depending on the direction of the departure from quadrature. Assuming that the instantaneous value of voltage from source 1 is positive at cathode 11 when diode 7 conducts, it will cause a decrease in the current through that diode. This chosen condition entails the occurrence of a positive voltage at anode 12 when diode 10 conducts on the subsequent half cycle. Accordingly, this will cause an increase in the current through diode 10. Since the negative voltage at anode 6 has decreased, whereas the positive voltage at cathode 9 has increased, the net result is the occurrence of a positive voltage at output terminal 21 of phase detector 3.

Phase detector 3′ operates in identical fashion.

However, since the voltage supplied to it from oscillator 23 has previously been shifted in phase through 90° by phase shifter 23, it follows that the voltage at output terminal 21′ of phase detector 3′ is a maximum when that at output terminal 21 of phase detector 3 is zero, and vice versa.

Reactance modulator 24 is poled such that the occurrence of a unidirectional voltage of one particular polarity at its input terminal 25 will cause a small correction in the phase of the output voltage from oscillator 22, which will bring it into the required quadrature phase relationship with the signal from source 1 to insure substantially zero voltage at terminal 21. Thus, in normal operation, oscillator 22 is controlled so that the signal which it supplies to phase detector 3 is of identical frequency with that from source 1 and is normally in quadrature relationship with it. It is obvious that since the signal from source 1 is continuously interrupted in accordance with the coding of keying for the transmission of intelligence, a signal is not always available at terminal 21 for effecting a frequency correction to oscillator 22. However, reactance modulator 24 may be provided with a sufficiently long time-constant in its frequency response characteristic to insure substantially constant frequency during normal keying intervals.

As has already been stated, the voltage at terminal 21′ of phase detector 3′ is a maximum when zero voltage occurs at terminal 21 of phase detector 3, providing a signal is actually being received from source 1. Accordingly, a unidirectional voltage occurs at output terminal 21′ which corresponds exactly with the occurrence of a continuous wave from source 1. Terminal 21′ may be connected to a suitable utilization circuit, such as, for instance, the coil of a relay 26. A circuit is thereupon completed through a pair of terminals 27 whenever a signal is received from source 1. Suitable utilization circuits may be connected to terminals 27, such as, for instance, a telemetering device for recording the signals.

The continuous wave detection system which has been described has the advantage that if an interfering signal is present within the bandwidth of source 1 but slightly removed from the frequency of the desired signal, it will not affect reception of the desired signal. This results from the fact that the long time-constant of reactance modulator 24 prevents rapid changes in its output frequency. Accordingly, oscillator 22 cannot synchronize to an undesired signal between keying pulses from the desired signal. The operation of the phase detectors 3 and 3′ is dependent upon the maintenance of an exact predetermined phase relationship between the signals applied to the input terminals. If signals of different frequencies are supplied to the input terminals, an alternating voltage having a frequency equal to the difference in frequency of the input signals occur at the output terminals 21 and 21′. The utilization circuit, such as relay 26 which has been shown, may be such that it responds to a unidirectional voltage only and, accordingly, the circuit through terminal 27 will not be completed. Likewise, random noise will not affect operation since its components of energy at the synchronous frequency are very minute and the detector 3 responds only to signals of that exact frequency.

While a certain specific embodiment has been shown and described, it is also to be understood that various modifications may be made without departing from the invention. For instance, whereas the system has been described with reference to a source of coded continuous waves, it is equally applicable to a frequency shift keying system, wherein shifting to a closely adjacent frequency corresponds to the absence of a carrier in a coded continuous wave system. Similarly, whereas reactance modulator 24 is illustrated as connected to the output terminal of one of the phase detectors and relay 26 is illustrated as connected to the other, these connections, of course, may be reversed where it is desired that the oscillations from source 22 be maintained in phase with the carrier waves from source 1, rather than in quadrature relation. The appended claims are therefore intended to cover any such modifications within the true spirit and scope of the invention.

What I claim as new and desire to secure by Letters Patent of the United States is:

1. A continuous wave detection system comprising a source of continuous waves, a pair of phase detectors, each of said detectors being adapted to render a unidirectional output voltage whose magnitude and polarity depend on the relative phase of a pair of alternating input voltages, direct connections from said source to each of said phase detectors, an oscillator, connections from said oscillator directly to one of said detectors and through a ninety degree phase shift network to the other of said detectors, means operating from one of said unidirectional output voltages to control the frequency of said oscillator, and a utilization circuit for receiving the other of said unidirectional voltages.

2. A continuous wave detection system comprising a source of continuous waves, a pair of phase detectors, the first of said detectors being adapted to render a unidirectional output voltage only when a pair of alternating input voltages are in identical phase, the other of said detectors being adapted to render a unidirectional output voltage which increases from zero to a positive or to a negative value as a pair of alternating input voltages deviate in one direction or the other from a condition of phase quadrature, an oscillator, connections from said source and from said oscillator to both said phase detectors for providing said detectors with said alternating input voltages, means operating from the unidirectional output voltage of said second detector to control the frequency of the alternating voltage from said oscillator and maintain it in phase quadrature with that from said source, and a utilization circuit for receiving the unidirectional output voltages from said first detector.

3. A continuous wave detection system comprising a source of alternating signal voltage interrupted in accordance with code characters, a pair of phase detectors, each of said detectors having a first input terminal connected to said source for receiving said signal, a second input terminal for receiving a reference alternating voltage, and an output terminal providing a unidirectional output voltage which varies from a maximum positive value, through zero, to a maximum negative value as said alternating voltages vary from identical phase conditions, through quadrature, to opposite phase conditions, an oscillator for providing said reference voltage directly to the second input terminal of one of said detectors and through a ninety degree phase shift network to the second input terminal of the other of said detectors, whereby the unidirectional output voltages at said one detector and at said other detector are normally a maximum and zero respectively when said alternating voltages are in identical phase, means controlled by said normally zero unidirectional voltage and operating on said oscillator for maintaining said reference voltage in identical phase with said source voltage, and a utilization circuit controlled by said normally maximum voltage.

4. A continuous wave detection system comprising a source of alternating signal voltage interrupted in accordance with code characters, a pair of phase detectors, each of said detectors having a first input terminal connected to said source for receiving said signal, a second input terminal for receiving a reference alternating voltage, and an output terminal providing a unidirectional output voltage which varies from a maximum positive value, through zero, to a maximum negative value as said alternating voltages vary from identical phase conditions, through quadrature, to opposite phase conditions, an oscillator for providing said reference voltage directly to the second input terminal of one of said detectors and through a ninety degree phase shift network to the second input terminal of the other of said detectors, whereby the unidirectional output voltages at said one detector and at said other detector are normally a maximum and zero respectively when said alternating voltages occur in identical phase, a reactance tube connected to said oscillator, a connection from the output terminal of said other detector to said reactance tube for controlling the frequency of said oscillator to maintain identical phase in said reference voltage with said signal voltage, and a utilization circuit connected to the output terminal of said one detector.

5. A continuous wave detection system comprising a source of alternating signal voltage interrupted in accordance with code characters, an oscillator providing a reference alternating voltage, a pair of phase detectors, each of said detectors comprising a pair of rectifiers having one pair of unlike poles capacitively coupled to an input terminal, conductive connections from the other pair of unlike poles to the end terminals of an impedance having a mid-point connection to ground, a first pair of resistances connecting said first pair of poles to ground, a second pair of resistances connecting said first pair of poles to an output terminal, one of said phase detectors having its input terminal directly connected to said oscillator for receiving said reference voltage, and the other of said phase detectors having its input terminal connected to said oscillator through a ninety degree phase shifting network for receiving said reference voltage in quadrature phase relationship, means for developing said signal voltage across said impedances in both said phase detectors, a reactance tube for controlling the frequency of said oscillator, said tube having a control terminal connected to one of said output terminals, and a utilization circuit connected to the other of said output terminals.

6. In combination, a source of keyed carrier waves of a given frequency, a source of continuous waves, a demodulator, means for applying said keyed and continuous waves to said demodulator for generating a unidirectional potential having an amplitude depending upon the phase difference of said applied waves, means responsive to said unidirectional potential for adjusting the frequency of said continuous waves to be in phase quadrature with said keyed carrier wave, a second demodulator, means for applying the wave from said two sources cophasally to said second demodulator for generating another unidirectional potential, said second demodulator responsive to the keying of said keyed carrier waves for providing a corresponding variation in the amplitude of said other unidirectional potential, and an output circuit responsive only to said other unidirectional potential.

7. A demodulation system comprising a source of received carrier waves modulated in accordance with desired signals, a pair of phase detectors, each of said detectors being adapted to render a unidirectional output voltage whose magnitude and polarity depend on the relative phase of a pair of alternating input voltages, direct connections from said source of received carrier waves to each of said phase detectors, an oscillator, connections from said oscillator directly to one of said detectors and through a ninety degree phase shift network to the other of said detectors, means responsive to the unidirectional output voltage of one of said detectors to control the frequency of said oscillator, and means responsive to the other of said unidirectional voltages to operate in accordance with said desired signals.

RICHARD C. EATON.

REFERENCES CITED

The following references are of record in the file of this patent:

UNITED STATES PATENTS

| Number | Name | Date |
|---|---|---|
| 2,104,801 | Hansell | Jan. 11, 1938 |
| 2,173,231 | Koch | Sept. 19, 1939 |
| 2,231,704 | Curtis | Feb. 11, 1941 |
| 2,339,851 | Hansell | Jan. 25, 1944 |
| 2,494,323 | Weber | Jan. 10, 1950 |